United States Patent
Huang-Fu et al.

(10) Patent No.: US 11,310,320 B2
(45) Date of Patent: Apr. 19, 2022

(54) ENHANCED PROCEDURE TRANSACTION ID (PTI) ERROR HANDLING

(71) Applicant: MEDIATEK INC., Hsin-Chu (TW)

(72) Inventors: Chien-Chun Huang-Fu, Hsin-Chu (TW); Yu-Chieh Tien, Hsin-Chu (TW)

(73) Assignee: MediaTek INC., Hsin-Chu (TW)

( * ) Notice: Subject to any disclaimer, the term of this patent is extended or adjusted under 35 U.S.C. 154(b) by 59 days.

(21) Appl. No.: 16/835,442

(22) Filed: Mar. 31, 2020

(65) Prior Publication Data

US 2020/0314187 A1 Oct. 1, 2020

Related U.S. Application Data

(60) Provisional application No. 62/827,254, filed on Apr. 1, 2019.

(51) Int. Cl.
*H04L 29/08* (2006.01)
*H04W 76/10* (2018.01)
(Continued)

(52) U.S. Cl.
CPC ............ *H04L 67/14* (2013.01); *H04L 69/322* (2013.01); *H04W 12/06* (2013.01); *H04W 36/14* (2013.01); *H04W 76/10* (2018.02); *H04W 76/27* (2018.02)

(58) Field of Classification Search
CPC ... H04W 72/042; H04W 24/10; H04W 76/27; H04W 72/0413; H04W 72/04;
(Continued)

(56) References Cited

U.S. PATENT DOCUMENTS

| 2011/0130157 A1* | 6/2011 | Griot ..................... H04W 76/11 455/466 |
| 2015/0029866 A1 | 1/2015 | Liao et al. .................... 370/241 |

(Continued)

FOREIGN PATENT DOCUMENTS

| CN | 108141751 A | 9/2015 |
| CN | 108769976 A | 6/2018 |
| WO | WO2018174516 A1 | 3/2017 |

OTHER PUBLICATIONS

International Search Report and Written Opinion of International Search Authority for PCT/CN2020/082705 dated Jul. 6, 2020 (8 pages).
(Continued)

*Primary Examiner* — Kwasi Karikari
(74) *Attorney, Agent, or Firm* — Imperium Patent Works; Zheng Jin

(57) ABSTRACT

A method for Procedure Transaction Identity (PTI) error handling on 5G Session Management (5GSM) procedures is proposed. If a User Equipment (UE) receives a PDU SESSION AUTHENTICATION COMMAND or PDU SESSION AUTHENTICATION RESULT message in which the PTI value is an assigned value, the UE transmits a 5GSM STATUS message including 5GSM cause #81 "invalid PTI value". If the UE receives a PDU SESSION ESTABLISHMENT ACCEPT or REJECT message, a PDU SESSION MODIFICATION COMMAND or REJECT message, or a PDU SESSION RELEASE COMMAND or REJECT message in which the PTI value is an unassigned value, the UE ignores the received message. If the UE receives any 5GSM message in which the PTI value is a reserved value, the UE ignores the received 5GSM message.

9 Claims, 5 Drawing Sheets

(51) Int. Cl.
*H04W 76/27* (2018.01)
*H04W 36/14* (2009.01)
*H04W 12/06* (2021.01)
*H04L 67/14* (2022.01)
*H04L 69/322* (2022.01)

(58) Field of Classification Search
CPC ......... H04W 72/0446; H04W 72/0453; H04W 72/1289; H04W 52/0229; H04W 76/11; H04W 76/19; H04W 24/00; H04W 76/10; H04W 76/38; H04W 12/06
See application file for complete search history.

(56) References Cited

U.S. PATENT DOCUMENTS

| | | | |
|---|---|---|---|
| 2018/0295556 A1* | 10/2018 | Baek .................... | H04W 40/22 |
| 2020/0008268 A1 | 1/2020 | Huang-Fu et al. | |
| 2020/0015311 A1 | 1/2020 | Kim .................... | H04W 76/25 |
| 2021/0194634 A1* | 6/2021 | Sedlacek ............... | H04L 1/1671 |

OTHER PUBLICATIONS

Taiwan IPO, office action for the TW patent application 109111167 (no English translation is available) dated Feb. 8, 2021 (7 pages).
3GPP TS 24.501 V15.3.0 (Mar. 2019), 3rd Generation Partnership Project; Technical Specification Group Core Network and Terminals; Non-Access-Stratum (NAS) protocol for 5G (5GS); Stage 3 (Release 15), *sections 6.2.1, 6.3.1.2.4, 6.3-6.4, 6.5.1, 6.5.2, 6.5.3*.

* cited by examiner

ENHANCED PROCEDURE TRANSACTION ID (PTI) ERROR HANDLING

CROSS REFERENCE TO RELATED APPLICATIONS

This application claims priority under 35 U.S.C. § 119 from U.S. Provisional Application No. 62/827,254, entitled "Enhancement of PTI error handling", filed on Apr. 1, 2019, the subject matter of which is incorporated herein by reference.

TECHNICAL FIELD

The disclosed embodiments relate generally to wireless communication, and, more particularly, to method of supporting enhanced procedure transaction ID (PTI) error handling in next generation 5G mobile communication systems.

BACKGROUND

The wireless communications network has grown exponentially over the years. A Long-Term Evolution (LTE) system offers high peak data rates, low latency, improved system capacity, and low operating cost resulting from simplified network architecture. LTE systems, also known as the 4G system, also provide seamless integration to older wireless network, such as GSM, CDMA and Universal Mobile Telecommunication System (UMTS). In LTE systems, an Evolved Universal Terrestrial Radio Access Network (E-UTRAN) includes a plurality of evolved Node-Bs (eNodeBs or eNBs) communicating with a plurality of mobile stations, referred to as User Equipments (UEs). The $3^{rd}$ Generation Partner Project (3GPP) network normally includes a hybrid of 2G/3G/4G systems. With the optimization of the network design, many improvements have developed over the evolution of various standards. The Next Generation Mobile Network (NGMN) board, has decided to focus the future NGMN activities on defining the end-to-end requirements for 5G New Radio (NR) systems.

In 5G/NR, a Protocol Data Unit (PDU) session defines the association between the UE and the data network that provides a PDU connectivity service. Each PDU session is identified by a PDU session ID (PSI), and may include multiple QoS flows and QoS rules. The PDU session establishment is a parallel procedure of PDN connection (bearer) procedure in 4G/LTE. In 4G/LTE, a Procedure Transaction Identity (PTI) is an identity that is allocated by the UE for UE-requested bearer resource activation, modification, and deactivation procedures. Similarly, PTI is also used as an identity that is allocated by the UE for the UE-requested PDU session establishment, modification, and release procedure in 5G/NR.

In the current 3GPP specifications and/or requirements in compliance with 5G/NR, there are several cases in which the UE behavior is undefined when receiving a 5G Session Management (5GSM) message with an erroneous PTI value. For example, a UE may allocate an assigned PTI value for a UE-requested 5GSM procedure, and the assigned PTI value should be used throughout the UE-requested 5GSM procedure. However, during the UE-requested 5GSM procedure, the UE may receive a 5GSM message with an unknown, erroneous, or unforeseen PTI value. As a result, indeterminate UE behavior or even UE mis-operation may occur.

Likewise, the current 3GPP specifications and/or requirements in compliance with 5G/NR do not define specific network behavior on the reception of a 5GSM message with an erroneous PTI value. For example, a network entity may allocate an unassigned PTI value for a network-requested 5GSM procedure, and the unassigned PTI value should be used throughout the network-requested 5GSM procedure. However, during the network-requested 5GSM procedure, the network entity may receive a 5GSM message with an unknown, erroneous, or unforeseen PTI value. Therefore, indeterminate network behavior or even network mis-operation may occur.

A solution is sought.

SUMMARY

A method for Procedure Transaction Identity (PTI) error handling on 5G session management (5GSM) procedures is provided. The 5GSM procedure may include Protocol Data Unit (PDU) session establishment, modification, release, and authentication and authorization procedures.

In one embodiment, a UE allocates a PTI value in a mobile communication network. The PTI value identifies a UE-requested 5GSM procedure related to a PDU session. The UE transmits a 5GSM request to a network entity with the allocated PTI value. The UE receives a 5GSM response that is associated with the PDU session. The 5GSM response contains a UE-received PTI value. The UE determines whether a PTI error has occurred with the UE-received PTI value. The UE transmits a 5GSM STATUS message to the network entity or ignores the 5GSM response in response to a determined PTI error.

In one example, the UE transmits the 5GSM STATUS message including 5GSM cause #81 "invalid PTI value" when the 5GSM response is a PDU SESSION AUTHENTICATION COMMAND/RESULT message with a PTI error comprising that the UE-received PTI value is an assigned value. In another example, the UE transmits the 5GSM STATUS message including 5GSM cause #81 "invalid PTI value" or ignores the 5GSM response when the 5GSM response is a PDU SESSION ESTABLISHMENT ACCEPT/REJECT message, a PDU SESSION MODIFICATION REJECT message, or a PDU SESSION RELEASE REJECT message with a PTI error comprising that the UE-received PTI value is an unassigned value. In another example, the UE ignores the 5GSM response when the 5GSM response contains a PTI error comprising that the UE-received PTI value is a reserved value.

In another embodiment, a network allocates a PTI value in a mobile communication network. The PTI value identifies a network-requested 5GSM procedure related to a PDU session. The network entity transmits a 5GSM request to a UE with the allocated PTI value. The network entity receives a 5GSM response that is associated with the PDU session. The 5GSM response contains a network-received PTI value. The network entity determines whether a PTI error has occurred with the network-received PTI value. The network entity transmits a 5GSM STATUS message to the UE or ignores the 5GSM response in response to a determined PTI error.

In one example, the network entity transmits the 5GSM STATUS message including 5GSM cause #47 "PTI mismatch" when the 5GSM response is a PDU SESSION MODIFICATION COMPLETE message, a PDU SESSION RELEASE COMPLETE message, or a PDU SESSION MODIFICATION COMMAND REJECT message with a PTI error comprising that the network-received PTI value is an assigned or unassigned value not matching any in-use PTI values associated with the PDU session. Correspondingly, when the UE receives the 5GSM STATUS message with 5GSM cause #47 "PTI mismatch", the UE responds with aborting any ongoing 5GSM procedure related to the received PTI value and stopping any related timer. In another example, the network entity transmits the 5GSM STATUS message including 5GSM cause #81 "invalid PTI value" when the 5GSM response is a PDU SESSION AUTHENTICATION COMPLETE message with a PTI error comprising that the network-received PTI value is an assigned value. In another example, the network entity transmits the 5GSM STATUS message including 5GSM cause #81 "invalid PTI value" when the 5GSM response is a PDU SESSION ESTABLISHMENT REQUEST message, a PDU SESSION MODIFICATION REQUEST message, or a PDU SESSION RELEASE REQUEST message with a PTI error comprising that the network-received PTI value is an unassigned value. In another example, the network entity ignores the 5GSM response when the 5GSM response contains a PTI error comprising that the network-received PTI value is a reserved value.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
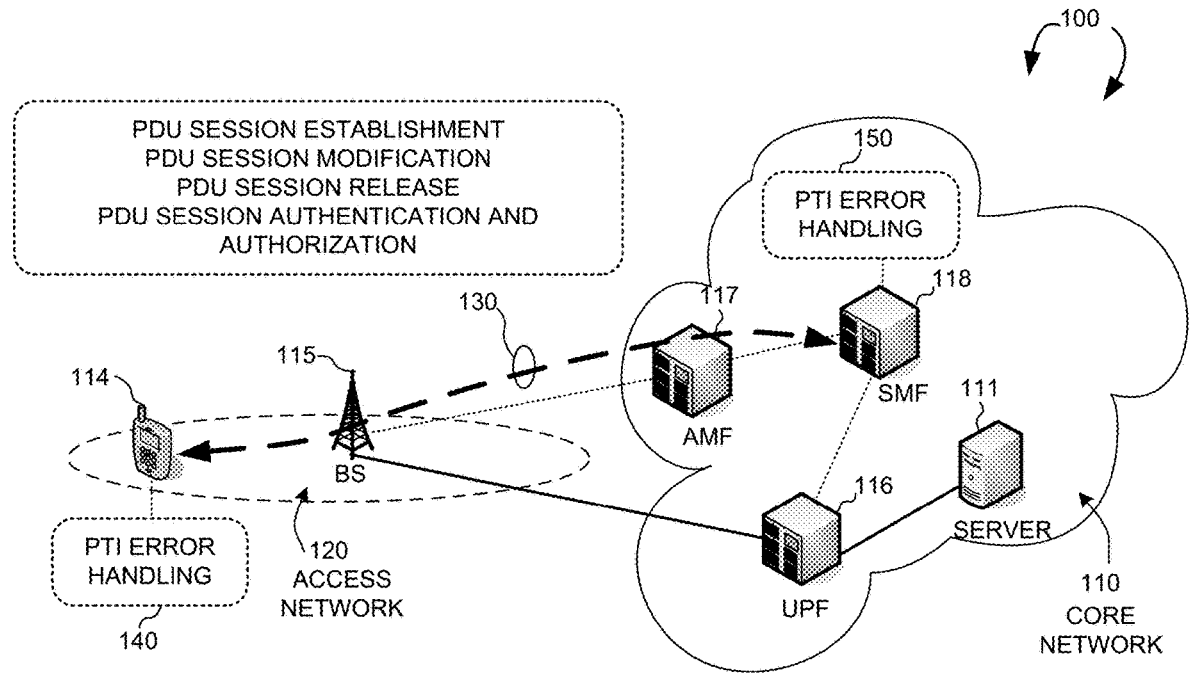
FIG. 1 illustrates an exemplary 5G New Radio (NR) network supporting enhanced Procedure Transaction Identity (PTI) error handling in accordance with one novel aspect.

FIG. 1 illustrates an exemplary 5G New Radio (NR) network 100 supporting enhanced Procedure Transaction Identity (PTI) error handling in accordance with one novel aspect. 5G/NR network 100 comprises application server 111 that provides various services by communicating with a plurality of User Equipments (UEs) including UE 114. In the example of FIG. 1, application server 111 belongs to a part of a Core Network (CN) 110. UE 114 and its serving base station BS 115 belong to part of a Radio Access Network (RAN) 120. RAN 120 provides radio access for UE 114 via a Radio Access Technology (RAT). Application server 111 communicates with UE 114 through User Plane Function (UPF) 116 and BS 115. An Access and Mobility Management Function (AMF) 117 communicates with BS 115, Session Management Function (SMF) 118, and UPF 116 for access and mobility management of wireless access devices in 5G/NR network 100. In the example of FIG. 1, AMF 117, SMF 118, and UPF 116 also belong to CN 110. UE 114 may be equipped with a Radio Frequency (RF) transceiver or multiple RF transceivers for different application services via different RATs/CNs. UE 114 may be a smart phone, a wearable device, an Internet of Things (IoT) device, and a tablet, etc.

In 5G/NR, a Protocol Data Unit (PDU) session defines the association between the UE and the data network that provides a PDU connectivity service. Each PDU session is identified by a PDU session ID (PSI), and may include multiple QoS flows and QoS rules. A Procedure Transaction Identity (PTI) is used as an identity that may be allocated by UE 114 or SMF 118 for 5GSM procedures, including the PDU session establishment procedure, the PDU session modification procedure, the PDU session release procedure, and the PDU session authentication and authorization procedure (130). In case a conventional UE receives a PDU SESSION AUTHENTICATION COMMAND/RESULT message in which the PTI value is an assigned value, the UE behavior is undefined. For example, the conventional UE does not know whether it shall respond to the received 5GSM message, or whether it shall just ignore the received 5GSM message. As a result, it creates a lot of issues with the indeterminate UE behavior. Similar issues will also happen in the PDU session establishment procedure, the PDU session modification procedure, and the PDU session release procedure at both the UE side and the network side. In case a conventional UE receives a PDU SESSION ESTABLISHMENT ACCEPT/REJECT message, a PDU SESSION MODIFICATION REJECT message, a PDU SESSION RELEASE REJECT message in which the PTI value is an unassigned value, the UE behavior is undefined. In case a conventional UE receives a 5GSM message in which the PTI value is a reserved value, the UE behavior is undefined.

In case a conventional network entity (e.g., an SMF) receives a PDU SESSION MODIFICATION COMPLETE message, a PDU SESSION RELEASE COMPLETE message, or a PDU SESSION MODIFICATION COMMAND REJECT message in which the PTI value is an assigned or unassigned value that does not match any in-use PTI values associated with the PDU session, the network behavior is undefined. For example, the conventional network entity does not know whether it shall respond with a 5GSM STATUS message including 5GSM cause #47 "PTI mismatch" or whether it shall just ignore the received 5GSM message, and it is not defined what the UE should respond to the 5GSM STATUS message with 5GSM cause #47. In case a conventional network entity (e.g., an SMF) receives a PDU SESSION AUTHENTICATION COMPLETE message in which the PTI value is an assigned value, the network behavior is undefined. In case a conventional network entity (e.g., an SMF) receives a PDU SESSION ESTABLISHMENT REQUEST message, a PDU SESSION MODIFICATION REQUEST message, or a PDU SESSION RELEASE REQUEST message in which the PTI value is an unassigned value, the network behavior is undefined. In case a conventional network entity (e.g., an SMF) receives a 5GSM message in which the PTI value is a reserved value, the network behavior is undefined.

In accordance with one novel aspect, the PTI error handling on 5GSM procedures from UE perspective is depicted by 140. In case UE 114 receives a PDU SESSION AUTHENTICATION COMMAND/RESULT message in which the PTI value is an assigned value (e.g., any value between 00000001~11111110 if the PTI value is 8-bit long), UE 114 responds with a 5GSM STATUS message including 5GSM cause #81 "invalid PTI value". In case UE 114 receives a PDU SESSION ESTABLISHMENT ACCEPT/REJECT message, a PDU SESSION MODIFICATION REJECT message, a PDU SESSION RELEASE REJECT message in which the PTI value is an unassigned value (e.g., 00000000 if the PTI value is 8-bit long), UE 114 transmits the 5GSM STATUS message including 5GSM cause #81 "invalid PTI value" or ignores the received 5GSM message. In case UE 114 receives a 5GSM message in which the PTI value is a reserved value (e.g., 11111111 if the PTI value is 8-bit long), UE 114 ignores the received 5GSM message. In case UE 114 receives a 5GSM STATUS message including 5GSM cause #47 "PTI mismatch", UE 114 aborts any ongoing 5GSM procedure related to the received PTI value and stops any related timer.

In accordance with one novel aspect, the PTI error handling on 5GSM procedures from network perspective is depicted by 150. In case SMF 118 receives a PDU SESSION MODIFICATION COMPLETE message, a PDU SESSION RELEASE COMPLETE message, or a PDU SESSION MODIFICATION COMMAND REJECT message in which the PTI value is an assigned or unassigned value that does not match any in-use PTI values associated with the PDU session, SMF 118 responds with a 5GSM STATUS message including 5GSM cause #47 "PTI mismatch". In case SMF 118 receives a PDU SESSION AUTHENTICATION COMPLETE message in which the PTI value is an assigned value, SMF 118 responds with a 5GSM STATUS message including 5GSM cause #81 "invalid PTI value". In case SMF 118 receives a PDU SESSION ESTABLISHMENT REQUEST message, a PDU SESSION MODIFICATION REQUEST message, or a PDU SESSION RELEASE REQUEST message in which the PTI value is an unassigned value, SMF 118 responds with a 5GSM STATUS message including 5GSM cause #81 "invalid PTI value". In case 118 receives a 5GSM message in which the PTI value is a reserved value, SMF 118 ignores the received 5GSM message.

Figure 2:
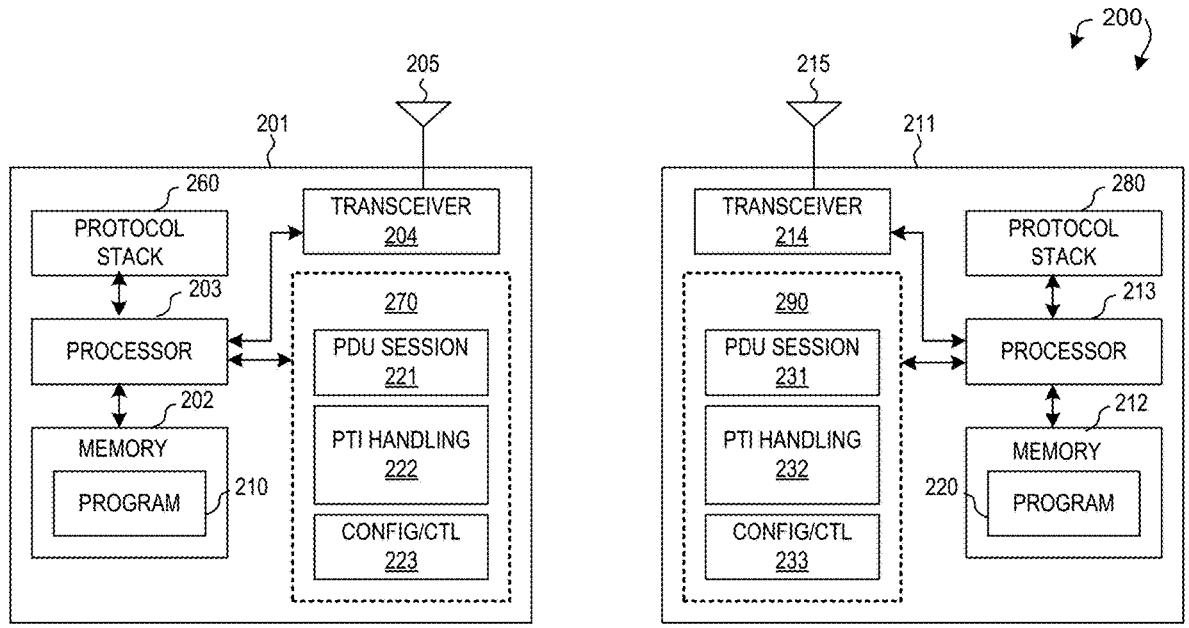
FIG. 2 illustrates simplified block diagrams of wireless devices in accordance with embodiments of the current invention.

FIG. 2 illustrates simplified block diagrams of wireless devices, e.g., a UE 201 and network entity 211 in accordance with embodiments of the current invention. Network entity 211 may be a base station combined with an AMF. Network entity 211 has an antenna 215, which transmits and receives radio signals. An RF transceiver 214, coupled with the antenna 215, receives RF signals from antenna 215, converts them to baseband signals and transmits them to processor 213. RF transceiver 214 also converts received baseband signals from processor 213, converts them to RF signals, and transmits out to antenna 215. Processor 213 processes the received baseband signals and invokes different functional modules to perform features in network entity 211. Memory 212 stores program instructions and data 220 to control the operations of network entity 211. In the example of FIG. 2, network entity 211 also includes a set of control functional modules and circuit 290. PDU session handling circuit 231 handles PDU session establishment, modification, release, and authentication and authorization procedures. PTI handling circuit 232 maintains a PTI table in memory 212, allocates and releases PTI for corresponding 5GSM procedure, and handles PTI errors accordingly. Configuration-and-control circuit 233 provides different parameters to configure and control UE 201.

Similarly, UE 201 has memory 202, a processor 203, and RF transceiver 204. RF transceiver 204 is coupled with antenna 205, receives RF signals from antenna 205, converts them to baseband signals, and transmits them to processor 203. RF transceiver 204 also converts received baseband signals from processor 203, converts them to RF signals, and transmits out to antenna 205. Processor 203 processes the received baseband signals and invokes different functional modules and circuits to perform features in UE 201. Memory 202 stores data and program instructions 210 to be executed by processor 203 to control the operations of UE 201. Suitable processors include, by way of example, a special purpose processor, a Digital Signal Processor (DSP), a plurality of micro-processors, one or more micro-processor associated with a DSP core, a controller, a microcontroller, Application Specific Integrated Circuits (ASICs), File Programmable Gate Array (FPGA) circuits, and other type of Integrated Circuits (ICs). A processor in associated with software may be used to implement and configure features of UE 201.

UE 201 also includes a set of functional modules and control circuits to carry out functional tasks of UE 201. Protocol stacks 260 includes Non-Access-Stratum (NAS) layer to communicate with an AMF and/or an SMF in the core network, Radio Resource Control (RRC) layer for high layer configuration and control, Packet Data Convergence Protocol/Radio Link Control (PDCP/RLC) layer, Media Access Control (MAC) layer, and Physical (PHY) layer. System modules and circuits 270 may be implemented and configured by software, firmware, hardware, and/or combination thereof. The function modules and circuits, when executed by processor 203 via program instructions contained in memory 202, interwork with each other to allow UE 201 to perform embodiments and functional tasks and features in the mobile communication network. In one example, system modules and circuits 270 include PDU session handling circuit 221 that handles PDU session PDU session establishment, modification, release, and authentication and authorization procedures, a PTI handling circuit 222 that maintains a PTI table in UE memory 202, allocates and releases PTI for corresponding 5GSM procedure, and handles PTI errors accordingly, and a configuration-and-control circuit 223 that handles configuration and control parameters from the network.

Figure 3:
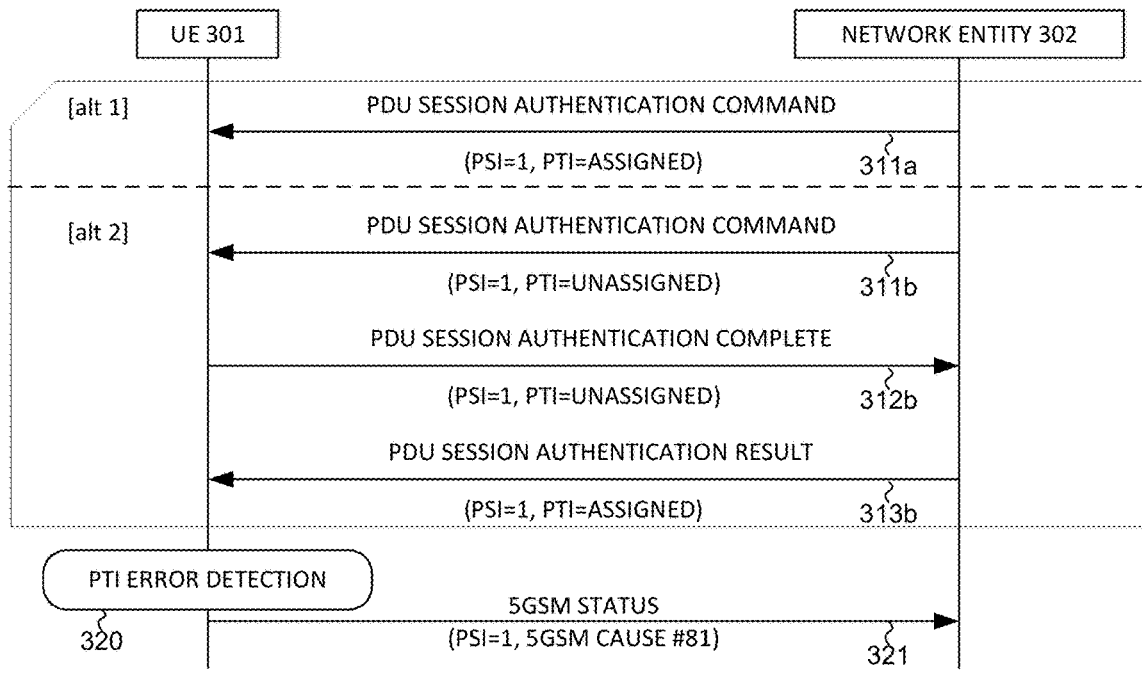
FIG. 3 illustrates a first embodiment of PTI error handling by a UE during a PDU session authentication and authorization procedure in accordance with one novel aspect.

FIG. 3 illustrates a first embodiment of PTI error handling by a UE during a PDU session authentication and authorization procedure in accordance with one novel aspect. In step 311a, UE 301 receives a PDU SESSION AUTHENTICATION COMMAND message from network entity 302 (e.g., an SMF). The PDU SESSION AUTHENTICATION COMMAND message includes PSI=1 and PTI=assigned value which is invalid for the specific 5GSM message.

Alternatively, in step 311b, UE 301 receives a PDU SESSION AUTHENTICATION COMMAND message from network entity 302. The PDU SESSION AUTHENTICATION COMMAND message includes PSI=1 and PTI=unassigned value. Due to that the PTI=unassigned value is valid for the specific 5GSM message, no PTI error is detected. In step 312b, UE 301 responds with a PDU SESSION AUTHENTICATION COMPLETE message to network entity 302. The PDU SESSION AUTHENTICATION COMPLETE message includes PSI=1 and PTI=unassigned value. After that, in step 313b, UE 301 receives a PDU SESSION AUTHENTICATION RESULT message from network entity 302. The PDU SESSION AUTHENTICATION RESULT message includes PSI=1 and PTI=assigned value which is invalid for the specific 5GSM message.

In step 320, upon receiving the PDU SESSION AUTHENTICATION COMMAND message with PTI=assigned value in step 311a or receiving the PDU SESSION AUTHENTICATION RESULT message with PTI=assigned value in step 313b, UE 301 determines that the received PTI=assigned value is invalid for the specific 5GSM message and thus detects a PTI error. In step 321, in response to the PTI error, UE 301 transmits a 5GSM STATUS message to network entity 302. The 5GSM STATUS message includes 5GSM cause #81 "invalid PTI value". The 5GSM cause #81 indicates that the PTI value is invalid for the specific 5GSM message.

Figure 4:
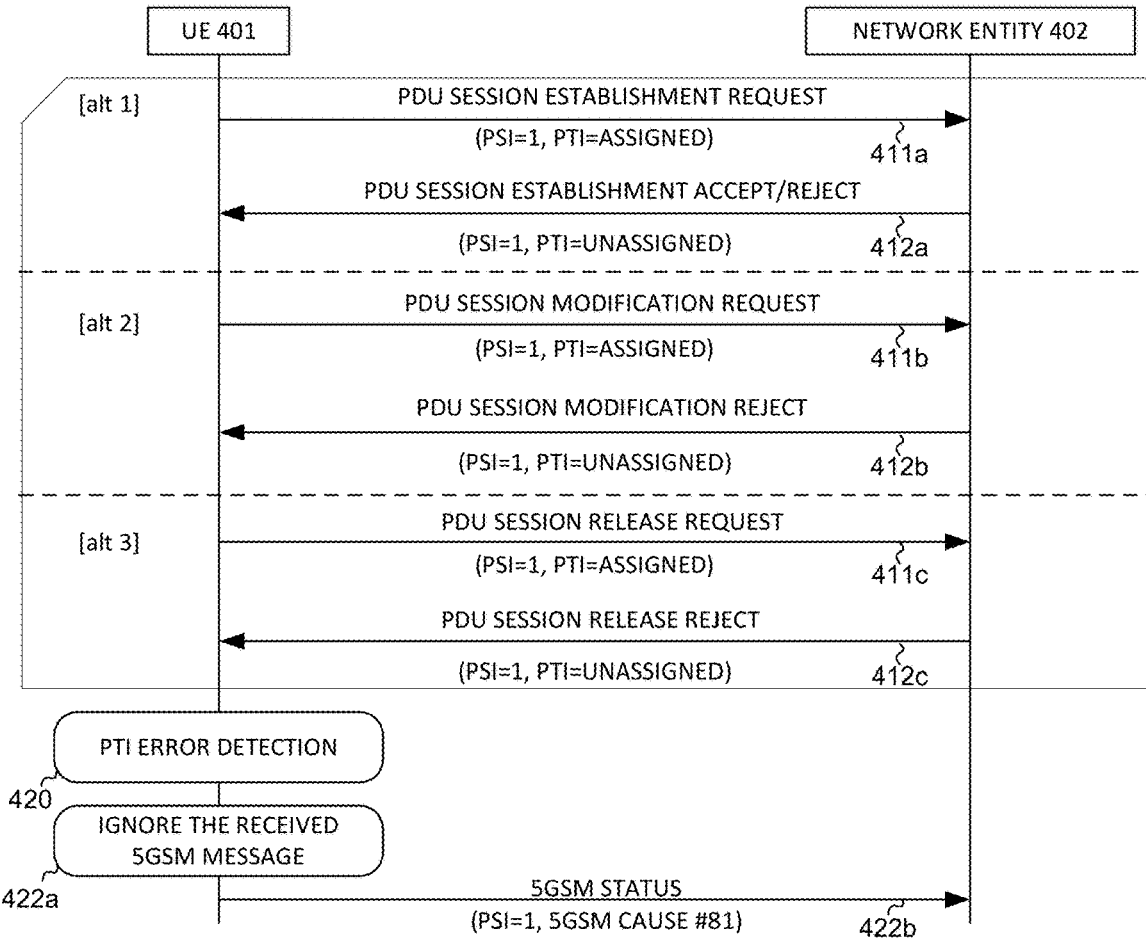
FIG. 4 illustrates a second embodiment of PTI error handling by a UE during a PDU session establishment, modification, or release procedure in accordance with one novel aspect.

FIG. 4 illustrates a second embodiment of PTI error handling by a UE during a PDU session establishment, modification, or release procedure in accordance with one novel aspect. In step 411a, UE 401 triggers a PDU session establishment procedure by transmitting a PDU SESSION ESTABLISHMENT REQUEST message to network entity 402 (e.g., an SMF). The PDU SESSION ESTABLISHMENT REQUEST message includes PSI=1 and PTI=assigned value. Subsequently, in step 412a, UE 401 receives a PDU SESSION ESTABLISHMENT ACCEPT/REJECT message from network entity 402. The PDU SESSION ESTABLISHMENT ACCEPT/REJECT message includes PSI=1 and PTI=unassigned value which is invalid for the specific 5GSM message. Alternatively, in step 411b, UE 401 triggers a PDU session modification procedure by transmitting a PDU SESSION MODIFICATION REQUEST message to network entity 402. The PDU SESSION MODIFICATION REQUEST message includes PSI=1 and PTI=assigned value. Subsequently, in step 412b, UE 401 receives a PDU SESSION MODIFICATION REJECT message from network entity 402. The PDU SESSION MODIFICATION REJECT message includes PSI=1 and PTI=unassigned value which is invalid for the specific 5GSM message. Alternatively, in step 411c, UE 401 triggers a PDU session release procedure by transmitting a PDU SESSION RELEASE REQUEST message to network entity 402. The PDU SESSION RELEASE REQUEST message includes PSI=1 and PTI=assigned value. Subsequently, in step 412c, UE 401 receives a PDU SESSION RELEASE REJECT message from network entity 402. The PDU SESSION RELEASE REJECT message includes PSI=1 and PTI=unassigned value which is invalid for the specific 5GSM message.

In step 420, upon receiving the PDU SESSION ESTABLISHMENT ACCEPT/REJECT message with PTI=unassigned value in step 411a or receiving the PDU SESSION MODIFICATION REJECT message with PTI=unassigned value in step 412b or receiving the PDU SESSION RELEASE REJECT message with PTI=unassigned value in step 412c, UE 401 determines that the received PTI=unassigned value is invalid for the specific 5GSM message and thus detects a PTI error. In step 422a, in response to the PTI error, UE 401 ignores the received 5GSM message (i.e., UE 401 does not respond to the received 5GSM message). Alternatively, in step 422b, in response to the PTI error, UE 401 transmits a 5GSM STATUS message to network entity 402. The 5GSM STATUS message includes 5GSM cause #81 "invalid PTI value". The 5GSM cause #81 indicates that the PTI value is invalid for the specific 5GSM message.

Figure 5:
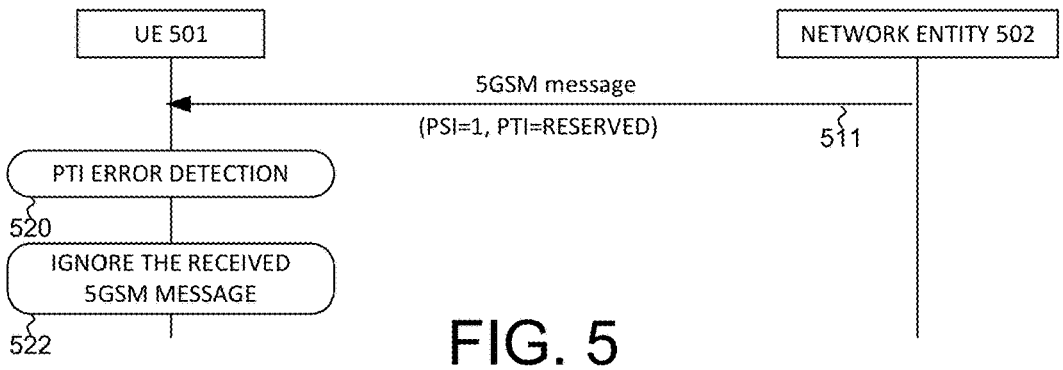
FIG. 5 illustrates a third embodiment of PTI error handling by a UE during any 5GSM procedure in accordance with one novel aspect.

FIG. 5 illustrates a third embodiment of PTI error handling by a UE during any 5GSM procedure in accordance with one novel aspect. In step 511, UE 501 receives a 5GSM message from network entity 502 (e.g., an SMF). The 5GSM message includes PSI=1 and PTI=reserved value. The 5GSM message may be a PDU SESSION ESTABLISHMENT ACCEPT/REJECT message, a PDU SESSION MODIFICATION COMMAND/REJECT message, a PDU SESSION RELEASE COMMAND/REJECT message, or a PDU SESSION AUTHENTICATION COMMAND/RESULT message. Upon receiving the 5GSM message with PTI=reserved value, in step 520, UE 501 determines that the received PTI=reserved value is invalid for the specific 5GSM message and thus detects a PTI error. In step 522, in response to the PTI error, UE 501 ignores the received 5GSM message (i.e., UE 501 does not respond to the received 5GSM message).

Figure 6:
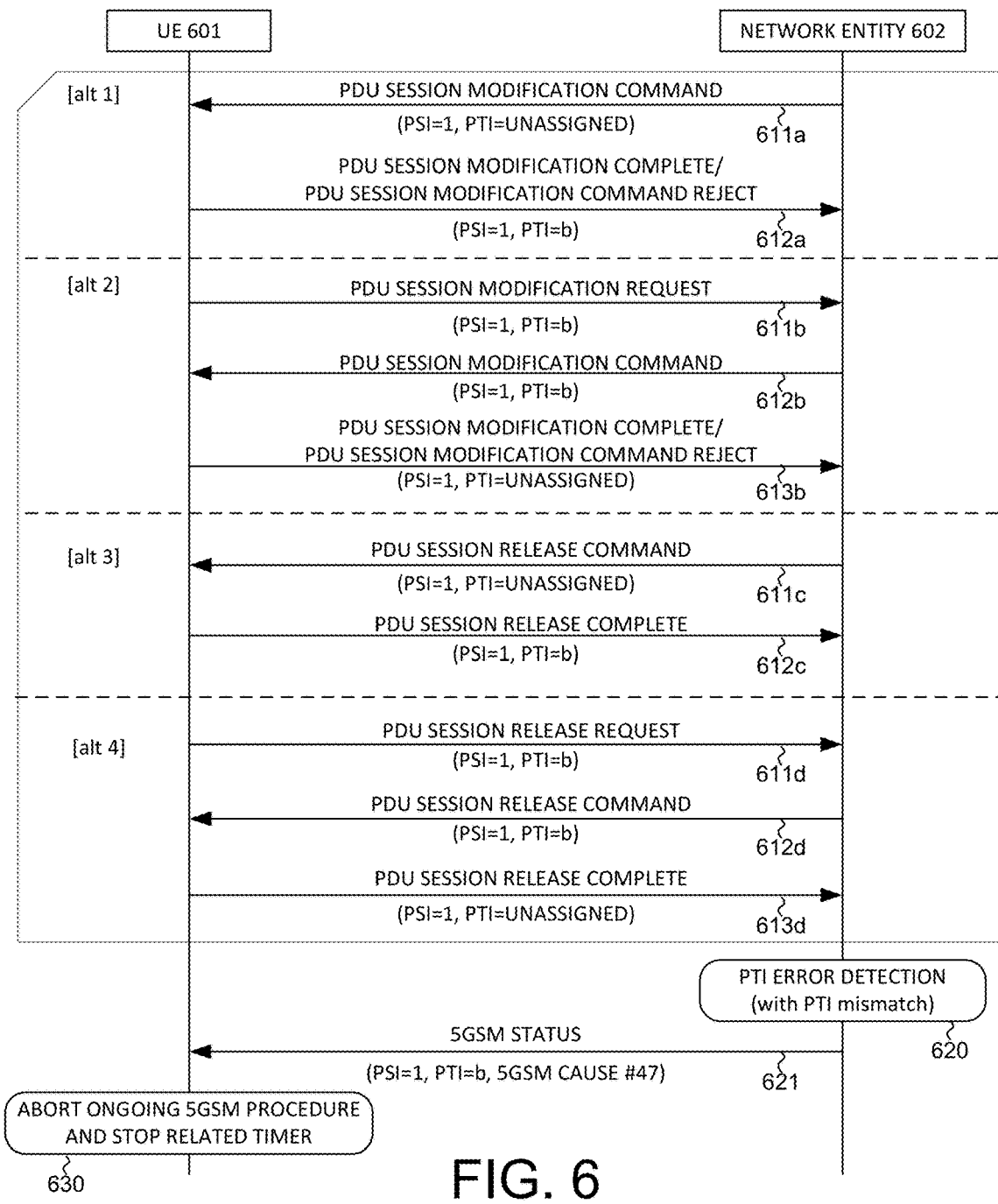
FIG. 6 illustrates a fourth embodiment of PTI error handling by a network entity during a PDU session modification or release procedure in accordance with one novel aspect.

FIG. 6 illustrates a fourth embodiment of PTI error handling by a network entity during a PDU session modification or release procedure in accordance with one novel aspect. In step 611a, network entity 602 (e.g., an SMF) triggers the PDU session modification procedure by transmitting a PDU SESSION MODIFICATION COMMAND message to UE 601. The PDU SESSION MODIFICATION COMMAND message includes PSI=1 and PTI=unassigned value. Subsequently, in step 612a, network entity 602 receives a PDU SESSION MODIFICATION COMPLETE message or a PDU SESSION MODIFICATION COMMAND REJECT message from UE 601. The PDU SESSION MODIFICATION COMPLETE message or the PDU SESSION MODIFICATION COMMAND REJECT message includes PSI=1 and PTI=b which is an assigned that does not match any in-use PTI values associated with the PDU session.

Alternatively, in step 611b, UE 601 triggers the PDU session modification procedure by transmitting a PDU SESSION MODIFICATION REQUEST message to network entity 602. The PDU SESSION MODIFICATION REQUEST message includes PSI=1 and PTI=b. Subsequently, in step 612b, UE 601 receives a PDU SESSION MODIFICATION COMMAND message from network entity 602. The PDU SESSION MODIFICATION COMMAND message includes PSI=1 and PTI=b. Next, in step 613b, network entity 602 receives a PDU SESSION MODIFICATION COMPLETE message or a PDU SESSION MODIFICATION COMMAND REJECT message from UE 601. The PDU SESSION MODIFICATION COMPLETE message or the PDU SESSION MODIFICATION COMMAND REJECT message includes PSI=1 and PTI=unassigned value which does not match any in-use PTI values associated with the PDU session.

Alternatively, in step 611c, network entity 602 triggers the PDU session release procedure by transmitting a PDU SESSION RELEASE COMMAND message to UE 601. The PDU SESSION RELEASE COMMAND message includes PSI=1 and PTI=unassigned value. Subsequently, in step 612c, network entity 602 receives a PDU SESSION RELEASE COMPLETE message from UE 601. The PDU SESSION RELEASE COMPLETE message includes PSI=1 and PTI=b which is an assigned value that does not match any in-use PTI values associated with the PDU session.

Alternatively, in step 611d, UE 601 triggers the PDU session release procedure by transmitting a PDU SESSION RELEASE REQUEST message to network entity 602. The PDU SESSION RELEASE REQUEST message includes PSI=1 and PTI=b. Subsequently, in step 612d, UE 601 receives a PDU SESSION RELEASE COMMAND message from network entity 602. The PDU SESSION RELEASE COMMAND message includes PSI=1 and PTI=b. Next, in step 613d, network entity 602 receives a PDU SESSION RELEASE COMPLETE message from UE 601. The PDU SESSION RELEASE COMPLETE message includes PSI=1 and PTI=unassigned value which does not match any in-use PTI values associated with the PDU session.

Due to that the PTI value received in steps 612a/613b/612c/613d does not match any in-use PTI values associated with the PDU session, a PTI mismatch is detected. In step 620, upon receiving the PDU SESSION MODIFICATION COMPLETE message, the PDU SESSION MODIFICATION COMMAND REJECT message, or the PDU SESSION RELEASE COMPLETE message with a PTI mismatch, network entity 602 determines that a PTI error has occurred with the PTI value. In step 621, in response to the PTI error, network entity 602 transmits a 5GSM STATUS message to UE 601. The 5GSM STATUS message includes 5GSM cause #47 "PTI mismatch". In step 630, upon receiving the 5GSM STATUS message with 5GSM cause #47, UE 601 aborts any ongoing 5GSM procedure related to the received PTI and stops any related timer.

Figure 7:
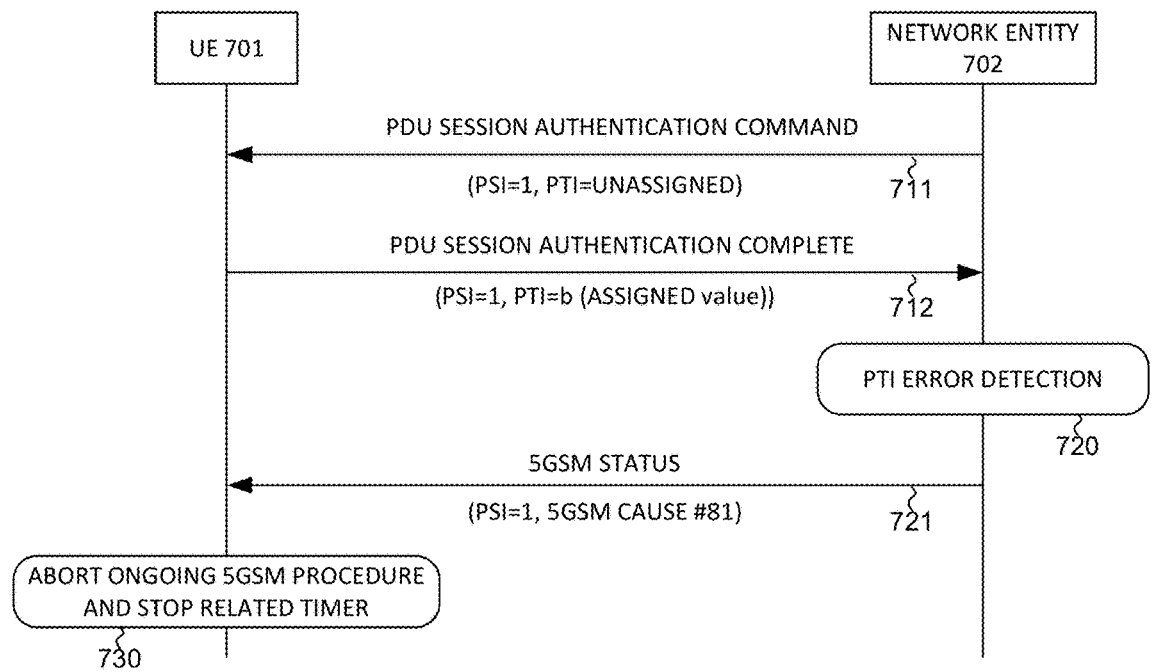
FIG. 7 illustrates a fifth embodiment of PTI error handling by a network entity during a PDU session authentication and authorization procedure in accordance with one novel aspect.

FIG. 7 illustrates a fifth embodiment of PTI error handling by a network entity during a PDU session authentication and authorization procedure in accordance with one novel aspect. In step 711, network entity 702 (e.g., an SMF) triggers the PDU session authentication and authorization procedure by transmitting a PDU SESSION AUTHENTICATION COMMAND message to UE 701. The PDU SESSION AUTHENTICATION COMMAND message includes PSI=1 and PTI=unassigned value. Subsequently, in step 712, network entity 702 receives a PDU SESSION AUTHENTICATION COMPLETE message from UE 701. The PDU SESSION AUTHENTICATION COMPLETE message includes PSI=1 and PTI=b (assigned) value which is invalid for the specific 5GSM message.

In step 720, upon receiving the PDU SESSION AUTHENTICATION COMPLETE message with PTI=assigned value, network entity 702 determines that the received PTI=assigned value is invalid for the specific 5GSM message and thus detects a PTI error. In step 721, in response to the PTI error, network entity 702 transmits a 5GSM STATUS message to UE 701. The 5GSM STATUS message includes 5GSM cause #81 "invalid PTI value". In step 730, upon receiving the 5GSM STATUS message with 5GSM cause #81, UE 701 aborts any ongoing 5GSM procedure related to the received PTI and stops any related timer.

Figure 8:
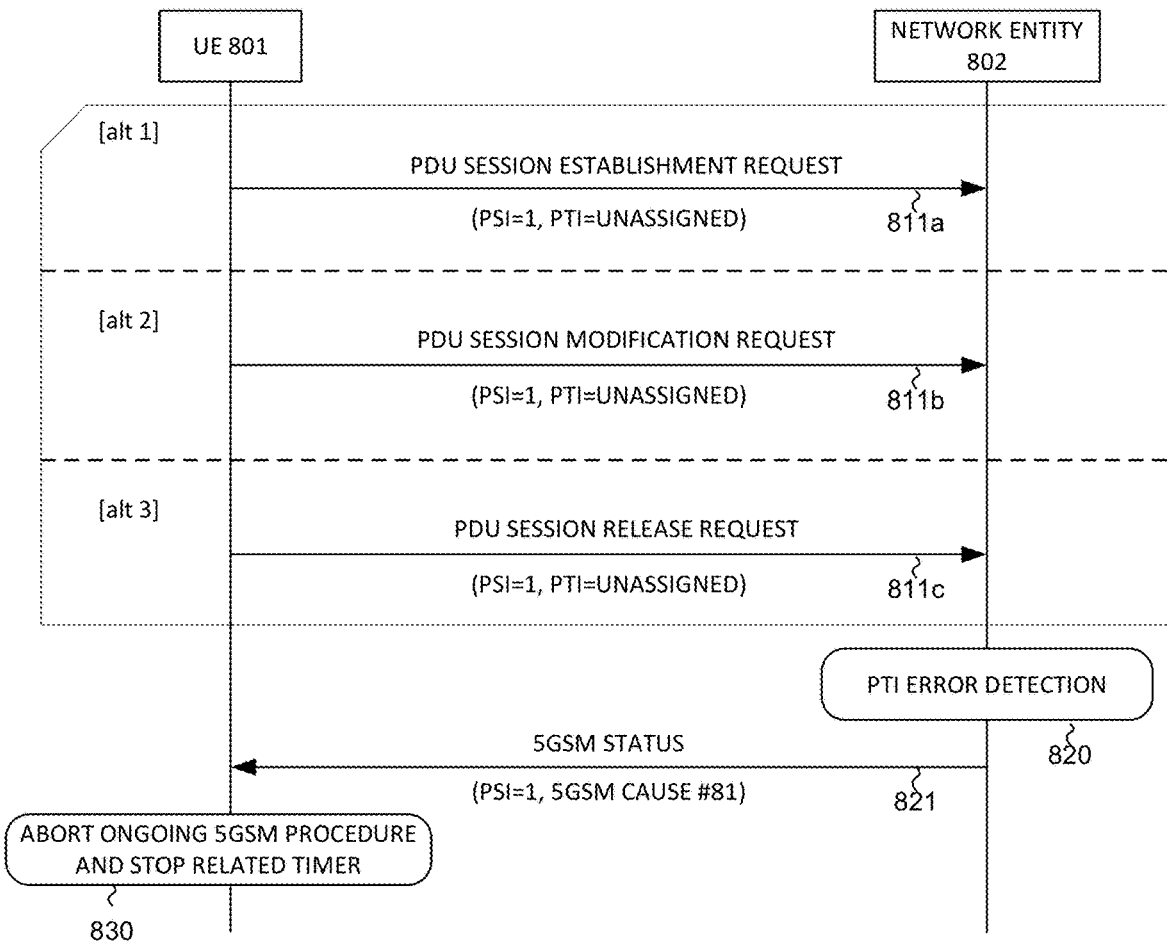
FIG. 8 illustrates a sixth embodiment of PTI error handling by a network entity during a PDU session establishment, modification, or release procedure in accordance with one novel aspect.

FIG. 8 illustrates a sixth embodiment of PTI error handling by a network entity during a PDU session establishment, modification, or release procedure in accordance with one novel aspect. In step 811a, UE 801 triggers a PDU session establishment procedure by transmitting a PDU SESSION ESTABLISHMENT REQUEST message to network entity 802 (e.g., an SMF). The PDU SESSION ESTABLISHMENT REQUEST message includes PSI=1 and PTI=unassigned value. Alternatively, in step 811b, UE 801 triggers a PDU session modification procedure by transmitting a PDU SESSION MODIFICATION REQUEST message to network entity 802. The PDU SESSION MODIFICATION REQUEST message includes PSI=1 and PTI=unassigned value. Alternatively, in step 811c, UE 801 triggers a PDU session release procedure by transmitting a PDU SESSION RELEASE REQUEST message to network entity 802. The PDU SESSION RELEASE REQUEST message includes PSI=1 and PTI=unassigned value.

In step 820, upon receiving the PDU SESSION ESTABLISHMENT REQUEST message in step 811a, the PDU SESSION MODIFICATION REQUEST message in step 811b, or the PDU SESSION RELEASE REQUEST message in step 811c with PTI=unassigned value, network entity 802 determines that the received PTI=unassigned value is invalid for the specific 5GSM message and thus detects a PTI error. In step 822, in response to the PTI error, network entity 802 transmits a 5GSM STATUS message to UE 801. The 5GSM STATUS message includes 5GSM cause #81 "invalid PTI value". In step 830, upon receiving the 5GSM STATUS message with 5GSM cause #81, UE 801 aborts any ongoing 5GSM procedure related to the received PTI and stops any related timer.

Figure 9:
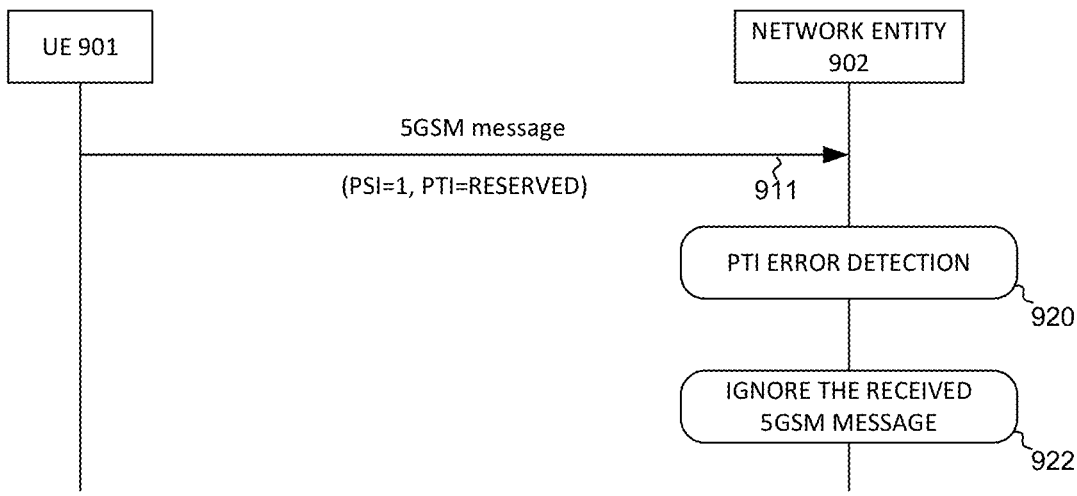
FIG. 9 illustrates a seventh embodiment of PTI error handling by a network entity during any 5GSM procedure in accordance with one novel aspect.

FIG. 9 illustrates a seventh embodiment of PTI error handling by a network entity during any 5GSM procedure in accordance with one novel aspect. In step 811, network entity 902 (e.g., an SMF) receives a 5GSM message from UE 901. The 5GSM message includes PSI=1 and PTI=reserved value. The 5GSM message may be a PDU SESSION ESTABLISHMENT REQUEST message, a PDU SESSION MODIFICATION REQUEST/COMPLETE/REJECT message, a PDU SESSION RELEASE REQUEST/COMPLETE message, or a PDU SESSION AUTHENTICATION COMPLETE message. Upon receiving the 5GSM message with PTI=reserved value, in step 920, network entity 902 determines that the received PTI=reserved value should not be used and thus detects a PTI error. In step 922, in response to the PTI error, network entity 902 ignores the received 5GSM message (i.e., network entity 902 does not respond to the received 5GSM message).

Figure 10:
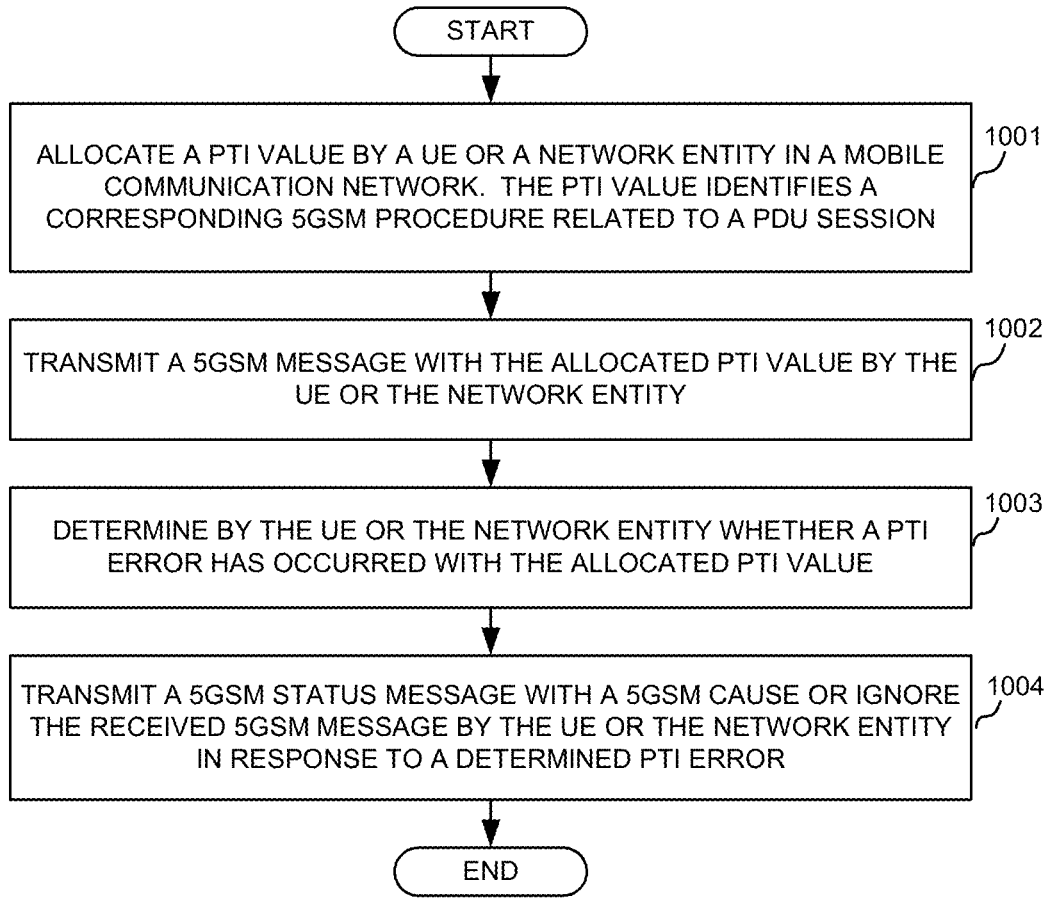
FIG. 10 is a flow chart of a method of supporting enhanced PTI error handling for 5G NR networks in accordance with one novel aspect.

FIG. 10 is a flow chart of a method of supporting enhanced PTI error handling for 5G NR networks in accordance with one novel aspect. In step 1001, a UE or a network entity allocates a PTI value in a mobile communication network. The PTI value identifies a corresponding 5GSM procedure related to a PDU session. In step 1002, the UE or the network entity transmits a 5GSM message with the allocated PTI value to one another. In step 1003, upon receiving the 5GSM message with the allocated PTI value, the UE or the network entity determines whether a PTI error has occurred with the allocated PTI value. In step 1004, the UE or the network entity transmits a 5GSM STATUS message with a 5GSM cause to one another or ignores the received 5GSM message in response to a determined PTI error occurred with the allocated PTI value.

In one example, the 5GSM STATUS message is transmitted in response to that the 5GSM message is a PDU SESSION AUTHENTICATION COMMAND message or a PDU SESSION AUTHENTICATION RESULT message, the PTI error refers to that the allocated PTI value is an assigned value, and the 5GSM cause includes cause #81 indicating that the allocated PTI value is invalid for the 5GSM message. In another example, the 5GSM STATUS message is transmitted or the 5GSM message is ignored in response to that the 5GSM message is a PDU SESSION ESTABLISHMENT ACCEPT message, a PDU SESSION ESTABLISHMENT REJECT message, a PDU SESSION MODIFICATION REJECT message, or a PDU SESSION RELEASE REJECT message, the PTI error refers to that the allocated PTI value is an unassigned value, and the 5GSM cause includes cause #81 indicating that the allocated PTI value is invalid for the 5GSM message. In another example, the 5GSM STATUS message is transmitted in response to that the 5GSM message is a PDU SESSION MODIFICATION COMPLETE message, a PDU SESSION RELEASE COMPLETE message, or a PDU SESSION MODIFICATION COMMAND REJECT message, the PTI error refers to that the allocated PTI value does not match any in-use PTI values associated with the PDU session, and the 5GSM cause includes cause #47 indicating the determined PTI mismatch. In another example, the 5GSM STATUS message is transmitted in response to that the 5GSM message is a PDU SESSION AUTHENTICATION COMPLETE message, the PTI error refers to that the allocated PTI value is an assigned value, and the 5GSM cause includes cause #81 indicating that the allocated PTI value is invalid for the 5GSM message. In another example, the 5GSM STATUS message is transmitted in response to that the 5GSM message is a PDU SESSION ESTABLISHMENT REQUEST message, a PDU SESSION MODIFICATION REQUEST message, or a PDU SESSION RELEASE REQUEST message, the PTI error refers to that the allocated PTI value is an unassigned value, and the 5GSM cause includes cause #81 indicating that the first PTI value is invalid for the 5GSM message. In another example, the 5GSM message is ignored in response to the PTI error referring to that the allocated PTI value is a reserved value.

In another embodiment, if the UE receives a 5GSM STATUS message comprising a 5GSM cause #47 "PTI mismatch", the UE may abort any ongoing 5GSM procedure related to the received PTI and stop any related timer.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   receiving a 5G Session Management (5GSM) message by a device in a mobile communication network, wherein the 5GSM message is associated with a Protocol Data Unit (PDU) session and comprises a Procedure Transaction Identity (PTI) value;
   determining whether a PTI error has occurred with the PTI value; and
   transmitting a 5GSM STATUS message comprising a 5GSM cause or ignoring the 5GSM message in response to a determined PTI error occurred with the PTI value, wherein the 5GSM STATUS message is transmitted in response to that the 5GSM message is a PDU SESSION AUTHENTICATION COMMAND message or a PDU SESSION AUTHENTICATION RESULT message, the PTI error comprises that the PTI value is an assigned value, and the 5GSM cause comprises cause #81 indicating that the PTI value is invalid.

2. The method of claim 1, wherein the cause #81 indicates that the PTI value is invalid for the 5GSM message.

3. A method, comprising:
   receiving a 5G Session Management (5GSM) message by a device in a mobile communication network, wherein the 5GSM message is associated with a Protocol Data Unit (PDU) session and comprises a Procedure Transaction Identity (PTI) value;
   determining whether a PTI error has occurred with the PTI value; and
   transmitting a 5GSM STATUS message comprising a 5GSM cause or ignoring the 5GSM message in response to a determined PTI error occurred with the PTI value, wherein the 5GSM STATUS message is transmitted or the 5GSM message is ignored in response to that the 5GSM message is a PDU SESSION ESTABLISHMENT ACCEPT message, a PDU SESSION ESTABLISHMENT REJECT message, a PDU SESSION MODIFICATION REJECT message, or a PDU SESSION RELEASE REJECT message, the PTI error comprises that the PTI value is an unassigned value, and the 5GSM cause comprises cause #81 indicating that the PTI value is invalid.

4. The method of claim 1, wherein the 5GSM message is ignored in response to the PTI error comprising that the PTI value is a reserved value.

5. A User Equipment (UE), comprising:
   a receiver that receives a 5G Session Management (5GSM) message from a network entity in a mobile communication network, wherein the 5GSM message is associated with a Protocol Data Unit (PDU) session and comprises a Procedure Transaction Identity (PTI) value;
   a PTI handling circuit that determines whether a PTI error has occurred with the PTI value; and
   a transmitter that transmits a 5GSM STATUS message comprising a 5GSM cause to the network entity or ignores the 5GSM message in response to a determined PTI error occurred with the PTI value, wherein the 5GSM STATUS message is transmitted in response to that the 5GSM message is a PDU SESSION AUTHENTICATION COMMAND message or a PDU SESSION AUTHENTICATION RESULT message, the PTI error comprises that the PTI value is an assigned value, and the 5GSM cause comprises cause #81 indicating that the PTI value is invalid.

6. The UE of claim 5, wherein the cause #81 indicates that the PTI value is invalid for the 5GSM message.

7. A User Equipment (UE), comprising:
   a receiver that receives a 5G Session Management (5GSM) message from a network entity in a mobile communication network, wherein the 5GSM message is associated with a Protocol Data Unit (PDU) session and comprises a Procedure Transaction Identity (PTI) value;
   a PTI handling circuit that determines whether a PTI error has occurred with the PTI value; and
   a transmitter that transmits a 5GSM STATUS message comprising a 5GSM cause to the network entity or ignores the 5GSM message in response to a determined PTI error occurred with the PTI value, wherein the 5GSM STATUS message is transmitted or the 5GSM message is ignored in response to that the 5GSM message is a PDU SESSION ESTABLISHMENT ACCEPT message, a PDU SESSION ESTABLISHMENT REJECT message, a PDU SESSION MODIFICATION REJECT message, or a PDU SESSION RELEASE REJECT message, the PTI error comprises that the PTI value is an unassigned value, and the 5GSM cause comprises cause #81 indicating that the PTI value is invalid.

8. The UE of claim 5, wherein the 5GSM message is ignored in response to the PTI error comprising that the PTI value is a reserved value.

9. A network entity, comprising:
a receiver that receives a 5G Session Management (5GSM) message from a User Equipment (UE) in a mobile communication network, wherein the 5GSM message is associated with a Protocol Data Unit (PDU) session and comprises a Procedure Transaction Identity (PTI) value;
a PTI handling circuit that determines whether a PTI error has occurred with the PTI value; and
a transceiver that transmits a 5GSM STATUS message comprising a 5GSM cause to the UE or ignores the 5GSM message in response to a determined PTI error occurred with the PTI value, wherein the 5GSM message is ignored in response to the PTI error comprising that the PTI value is a reserved value.

* * * * *